(12) United States Patent
Eckman

(10) Patent No.: US 11,513,370 B2
(45) Date of Patent: Nov. 29, 2022

(54) MITIGATION OF LENS CONDENSATION USING HEAT

(71) Applicant: Lineage Logistics, LLC, Irvine, CA (US)

(72) Inventor: Christopher Frank Eckman, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 322 days.

(21) Appl. No.: 16/985,853

(22) Filed: Aug. 5, 2020

(65) Prior Publication Data
US 2021/0055578 A1 Feb. 25, 2021

Related U.S. Application Data

(63) Continuation of application No. 16/523,924, filed on Jul. 26, 2019, now Pat. No. 10,768,450.

(51) Int. Cl.
| | |
|---|---|
| G02C 11/08 | (2006.01) |
| G02B 27/00 | (2006.01) |
| G01K 7/00 | (2006.01) |
| H05B 3/86 | (2006.01) |

(52) U.S. Cl.
CPC ............... *G02C 11/08* (2013.01); *G01K 7/00* (2013.01); *G02B 27/0006* (2013.01); *H05B 3/86* (2013.01)

(58) Field of Classification Search
CPC . G02C 11/08; G02C 5/00; G02C 7/10; G02C 11/10; G02C 13/006; G02C 5/008; G02C 7/12; G02C 11/04; G02C 3/02; G02C 5/02; G02C 7/00; G02B 27/0006; G02B 23/2423; G02B 1/18; G02B 7/02; G02B 7/028; G02B 1/118; G02B 1/14; G02B 23/2461; G02B 23/2484; G02B 27/0012;
(Continued)

(56) References Cited

U.S. PATENT DOCUMENTS

| | | | |
|---|---|---|---|
| 10,768,450 B1 * | 9/2020 | Eckman | H05B 3/86 |
| 2006/0272078 A1 | 12/2006 | Polinelli et al. | |
| 2014/0088366 A1 | 3/2014 | Solingen | |
| 2014/0192480 A1 | 7/2014 | Winkler et al. | |
| 2014/0374402 A1 | 12/2014 | Cornelius | |
| 2015/0238072 A1 | 8/2015 | Makmel | |
| 2016/0018646 A1 | 1/2016 | Osterhout et al. | |
| 2017/0172401 A1 | 6/2017 | Ide | |

(Continued)

FOREIGN PATENT DOCUMENTS

| | | |
|---|---|---|
| CN | 204462572 | 7/2015 |
| EP | 1455210 | 9/2004 |
| EP | 2631734 | 8/2013 |
| WO | WO 2017/070628 | 4/2017 |

OTHER PUBLICATIONS

PCT International Search Report and Written Opinion in International Application No. PCT/US2020/043335, dated Nov. 2, 2020, 19 pages.

(Continued)

*Primary Examiner* — Brandi N Thomas
(74) *Attorney, Agent, or Firm* — Fish & Richardson P.C.

(57) ABSTRACT

Systems, methods, devices, and other techniques for heating a lens to mitigate fogging. The methods can include identifying a temperature of the lens, identifying an ambient temperature of an environment of the lens, determining whether the lens is susceptible to fogging based at least on the temperature of the lens and the ambient temperature of the environment of the lens, and in response to determining that the lens is susceptible to fogging, causing a heating element to apply heat to the lens to mitigate fogging of the lens.

20 Claims, 10 Drawing Sheets

(58) Field of Classification Search
CPC .......... G02B 7/008; G02B 1/00; G02B 13/00;
G02B 21/28; G02B 21/30; G02B 30/00;
G02B 5/201; G02B 5/208; G03B 17/55;
G03B 17/02; G03B 17/08; G03B 15/00;
G03B 11/00; G03B 17/12; G03B
2217/002; G03B 30/00; A61B 1/127;
A61B 1/00006; A61B 1/0638; A61B
1/07; A61B 1/0655; A61B 1/0684; A61B
1/0008; A61B 1/00096; A61B 1/00165;
A61B 1/00193; A61B 1/002; A61B
1/00009; A61B 1/000096; A61B 1/128;
A61B 1/00059; A61B 1/00137; A61B
1/043; A61B 1/3132; A61B 1/00016;
A61B 1/00045; A61B 1/04; A61B
1/0676; A61B 1/12; A61B 1/267
See application file for complete search history.

(56) References Cited

U.S. PATENT DOCUMENTS

| | | |
|---|---|---|
| 2018/0045981 A1 | 2/2018 | Cornelius et al. |
| 2018/0113297 A1 | 4/2018 | Desai et al. |
| 2018/0146733 A1 | 5/2018 | Greenblat |
| 2018/0256398 A1 | 9/2018 | McCulloch et al. |

OTHER PUBLICATIONS

PCT Invitation to Pay Additional Fees in PCT Application No. PCT/US2020/043335, dated Sep. 11, 2020, 12 pages.

\* cited by examiner

MITIGATION OF LENS CONDENSATION USING HEAT

CROSS-REFERENCE TO RELATED APPLICATION

This application claims priority to U.S. patent application Ser. No. 16/523,924, titled "MITIGATION OF LENS CONDENSATION USING HEAT", filed Jul. 26, 2019, the entire content of which is incorporated herein by reference.

TECHNICAL FIELD

This specification describes techniques for reducing condensation build-up (e.g., fogging) on object surfaces that can result from changes in ambient temperatures to which the objects are exposed.

BACKGROUND

Warehouses can be used to store goods at different temperatures. A warehouse adapted for cold storage, for example, can have different rooms or areas that are maintained at different temperatures according to the type of good being stored, such as frozen food, refrigerated (but non-frozen) food, biologic materials, or pharmaceuticals. Workers and equipment in the warehouse are sometimes required to move from room to room, and are thus exposed to rapid changes in ambient temperature. These temperature changes can cause condensation to form on various surfaces including lenses through which a human or machine may need to view the environment (e.g., lenses in workers' glasses or lenses in a camera).

SUMMARY

This document generally describes systems, methods, devices, and other techniques for heating an object to prevent or reduce condensation from forming on it.

When an object moves from a colder environment to a warmer environment, condensation can form on the object. For lenses or other objects of transparent material, the condensation can render the object partially or fully opaque until the surface temperature of the object rises sufficiently to reach an equilibrium with the environment. This problem can be especially inconvenient when the transparent object is a lens, such as in a camera or eyeglasses, and especially if the lens frequently moves between environments with different ambient temperatures, such as in a cold storage facility or warehouse.

A cold storage facility can be divided into different "climate zones" that correspond to areas/regions of the facility that are maintained with different temperature profiles. Often, multiple climate zones are provided in a cold-storage facility to accommodate storage of different types of goods that require different storage temperatures (e.g., frozen vs non-frozen refrigerated storage). When the eyeglass lenses, for instance, move from a colder climate zone to a warmer zone, the wearer may be forced to either remove their eyeglasses to continue working or simply wait until the lenses have heated to the ambient temperature of the warmer zone before the impairment to his or her vision is removed. This is not only inconvenient for the worker, but also reduces the working efficiency with which the worker can complete his or her tasks. Similarly, when the lenses are provided as part of a camera system, lens condensation can impair the view of the camera and the system may be rendered unusable until the condensation is either removed manually or the lens to a sufficient degree that the condensation evaporates. In both situations, work efficiency is again reduced.

To prevent condensation when moving between climate zones, the lens can be heated or otherwise maintained above the dew point. The dew point is a temperature that is based on the temperature of the object (e.g., a lens or other surface where condensation may form), the ambient environmental temperature, and the ambient humidity level of the environment. By heating or maintaining the lens above the dew point, the lens may move between different climate zones without experiencing condensation that may reduce visibility through the lens or decrease working efficiency.

This specification describes techniques for applying heat to a lens to prevent condensation from forming on it or to quickly mitigate any condensation on the lens that has already formed. The techniques can include devices for measuring the temperature of the lens and the temperature of climate zones of a facility, devices for applying heat to the lens and controlling the application of heat to prevent or remove condensation in an efficient and energy conserving manner, devices (e.g., batteries) for providing power to the heater and other components of the system, devices for tracking the location of the lens as it moves through a facility, and devices for communicating with remote temperature and humidity sensors. In some implementations, the devices can include a heating controller that provides a processor for executing software instructions to measure the temperature differential between the lens and a climate zone, and can include a communication module (e.g., wireless communication module) for communicating with measurement devices. During operation, a heating controller determines when and how to apply heat to a lens (or the surface of another object). In this manner, battery power of the system can be conserved and the lifetime of the system extended.

Some implementations of the subject matter described herein include a method for heating a lens to mitigate fogging. The method can include identifying a temperature of the lens; identifying an ambient temperature of an environment of the lens; determining whether the lens is susceptible to fogging based at least on the temperature of the lens and the ambient temperature of the environment of the lens; and in response to determining that the lens is susceptible to fogging, applying heat to the lens to mitigate fogging of the lens.

These and other implementations can optionally include one or more of the following features.

Identifying the ambient temperature of the environment of the lens can include identifying an ambient temperature of a climate zone in which the lens is currently located.

Identifying the ambient temperature of the environment of the lens can include identifying an ambient temperature of a target climate zone where the lens is predicted to be located at a future point in time. The lens may not currently be located in the target climate zone at a time when the ambient temperature of the target climate zone is identified.

The method can include initiating application of the heat to the lens to mitigate fogging before the lens enters the target climate zone.

Applying the heat to the lens to mitigate fogging can include: determining heating characteristics for the application of the heat to the lens, the heating characteristics selected so as to ensure that the temperature of the lens will be sufficiently high to prevent fogging of the lens by a time that the lens is predicted to enter the target climate zone; and operating a heating element for the lens according to the determined heating characteristics.

Determining the heating characteristics for the application of the heat to the lens can include determining at least one of a time at which to activate the heating element, a time at which to increase a level of heat generated by the heating element, a duration for activating the heating element, a duration for causing the heating element to operate at a specified heating level, a level of heat to apply to the lens, a time at which to de-activate the heating element, or a time at which to decrease the level of heat generated by the heating element.

Identifying the temperature of the lens can include measuring a temperature signal from a temperature sensor located on, within, or proximate to the lens.

Identifying the temperature of the lens can include estimating the temperature of the lens based on a temperature of a climate zone in which the lens is current located, and identifying the ambient temperature of the environment of the lens comprises identifying an ambient temperature of a target climate zone where the lens is predicted to move at a future point in time.

Identifying the ambient temperature of the environment of the lens can include obtaining a real-time measurement of the ambient temperature of the environment of the lens.

Identifying the ambient temperature of the environment of the lens can include: identifying a climate zone in which the lens is currently located or to which the lens is predicted to travel within a period of time; and accessing a pre-defined temperature setting for the identified climate zone.

Determining whether the lens is susceptible to fogging can include comparing the temperature of the lens to a threshold temperature, wherein the threshold temperature is based at least on the ambient temperature of the environment of the lens.

The method can include identifying an ambient humidity level for the environment of the lens, wherein the threshold temperature to which the temperature of the lens is compared is further based on the ambient humidity level for the environment of the lens.

The threshold temperature to which the temperature of the lens is compared can be the dew point of the environment of the lens, or can be based on the dew point of the environment of the lens.

The environment of the lens can be within a cold-storage warehouse, and the lens can be arranged to travel together with a forklift or a forklift operator in the cold-storage warehouse.

Applying the heat to the lens can include directing excess heat generated by at least one of a computer processor or a motor of a vehicle to the lens.

The lens can be a lens of a camera system, an eyeglass, or an augmented reality headset.

Applying the heat to the lens to mitigate fogging of the lens can include preventing fog formation before it occurs, reducing fog formation before or after it occurs, or eliminating fog formation after it occurs.

Some implementations of the subject matter described herein include one or more non-transitory computer-readable media having instructions stored thereon that, when executed by one or more processing devices, cause the one or more processing devices to perform the computer-implemented methods and operations as described in this specification.

Some implementations of the subject matter described herein include a system for heating a lens to mitigate fogging. The system can include the lens, a heating element, and a controller. The controller can include one or more processors (e.g., processing devices) configured to perform operations that include: identifying a temperature of the lens; identifying an ambient temperature of an environment of the lens; determining whether the lens is susceptible to fogging based at least on the temperature of the lens and the ambient temperature of the environment of the lens; and in response to determining that the lens is susceptible to fogging, causing a heating element to apply heat to the lens to mitigate fogging of the lens.

DETAILED DESCRIPTION

Figure 1:
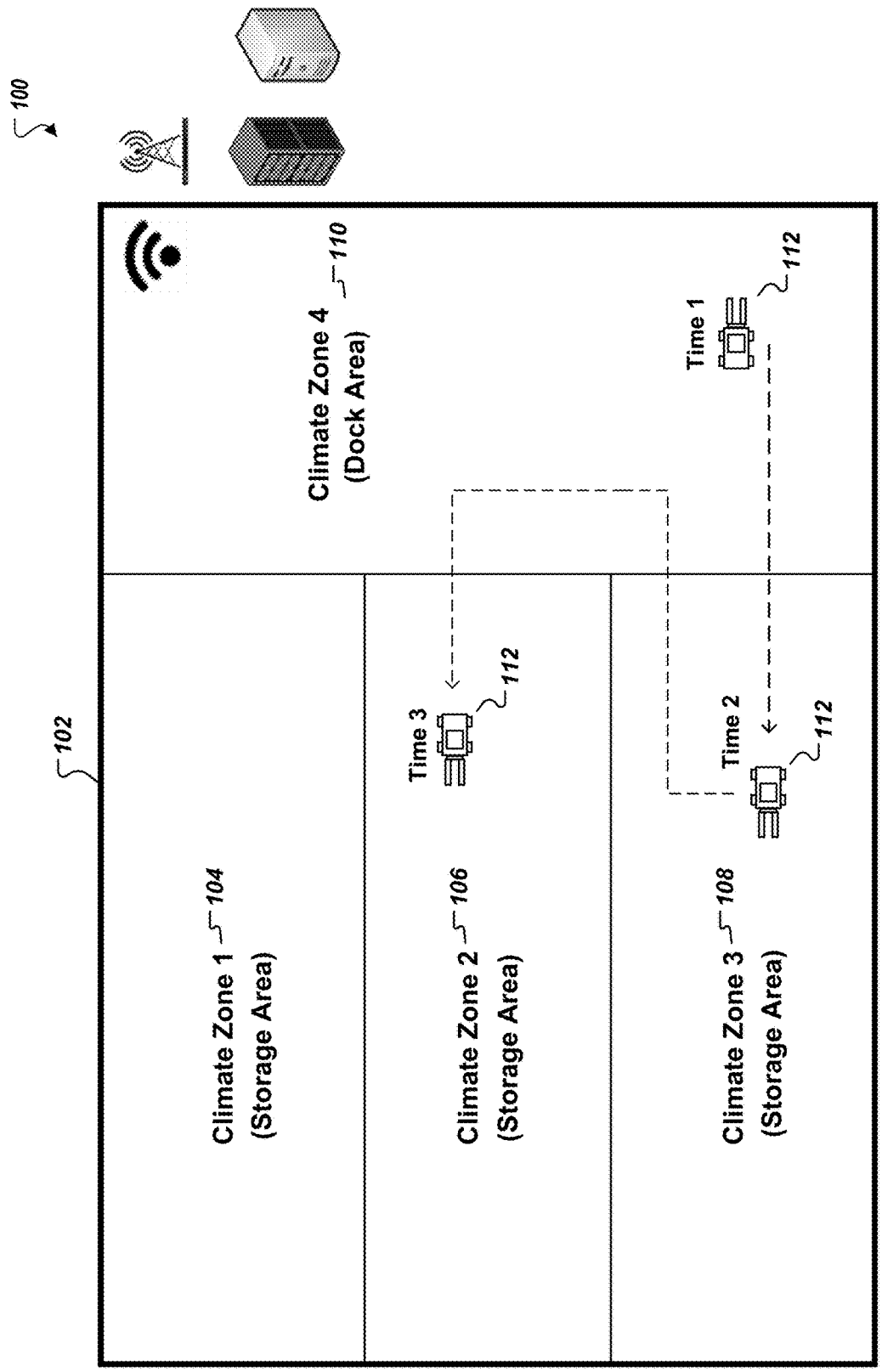
FIG. 1 depicts a camera mounted on a heater plate abutting a heat source.

This document describes systems, methods, devices, and other techniques for preventing or mitigating surface condensation on objects that can result from increases in the ambient temperature of the object's environment. In some implementations, the techniques can be applied to prevent condensation from forming on lenses that move from colder to warmer climate zones in a cold-storage warehouse or other facility. Example lenses to which these techniques may apply include lenses integrated into eyeglasses or a camera system. The techniques may also apply to mitigate condensation on other types of surfaces such as mirrors and electronic displays (e.g., touchscreens on smartphones, laptops, tablets, or smartwatches).

To prevent condensation, the object (e.g., lens) can be heated above the dew point. The dew point is a temperature that defines when condensation may form on an object from environmental humidity, and the dew point temperature is a function of the temperature of the object (e.g., lens), ambient temperature, and the humidity level in the environment. In general, preventing a lens from fogging when moving between different climate zones can involve applying heat to the lens either before it encounters a temperature change or during the change in temperature. By preventing formation or build-up of condensation (e.g., fogging), the lens may travel seamlessly between climate zones without obstruction of a view of the environment through the lens. In some implementations, a lens heater system can be automatically activated in advance of the lens moving into a different climate zone so that the temperature of the lens is already above the dew point before it enters the warmer climate zone and do not fog up upon entering the warmer climate zone.

A lens heater system can include a heating element (e.g., one or more filaments), a controller, one or more temperature sensors, one or more humidity sensors, an interface configured to facilitate communications between temperature and/or humidity sensors placed in one or more climate zones of the facility and perform logic operations to determine whether (and a manner in which) to activate the heating element. A heating filament can include an appropriate metal or metal alloy, such as Nichrome, resistance wire, or Cupronickel or other material, a polymer heating element, a composite heating element such as a metal-ceramic composite element or radiative heating element, or a combination of one or more heat conducting materials.

In some implementations, all or some of the climate zones within a facility, such as a cold storage warehouse, can include one or more temperature sensors, one or more humidity sensors, or both, that are respectively configured to determine one or more temperature and humidity measurements for the particular climate zone and communicate those measurements to the lens heater controller and/or a monitoring station that monitors temperatures of one or more climate zones in the facility as well as one or more lens heater systems that are in use in the facility. The temperature and humidity measuring devices (e.g., sensors) can communicate with the lens heater controller and/or the monitoring station through a communications interface. The communication channel can be wired or wireless (e.g., via BLUETOOTH or WIFI). In addition, the temperature and humidity measuring devices can communicate in real-time, such that the lens heater system and/or the monitoring station receive the most up-to-date, real-time measurements and/or changes in temperature and/or humidity. In another example, the temperature and humidity measuring devices can communicate changes in one or more temperature and/or humidity measurements upon request from the lens heater system and/or the monitoring station. In another example, the lens heater system (e.g., the controller) may periodically, or upon asynchronous triggering events, sample a temperature and/or humidity sensor to obtain a current observation (measurement) of the temperature and/or humidity of the environment.

In addition to those components, the location of the lens or other heated object can be tracked throughout a facility using any suitable micro-location tracking technique as known in the art. In some implementations, a computer vision system is provided with or in close proximity to the heated lens that captures images of the environment, determines distances between the lens and reference objects having pre-defined (known) locations in the facility, and determines a location of the lens by triangulation or other techniques that account for the distances between the current location of the lens and the locations of the one or more reference objects. In some implementations, a global positioning system (GPS) module may be provided in the lens heater system to ascertain geographic coordinates of the system from which a location of the lens within the facility can be derived.

In addition to knowing the location of the lens, the lens heater controller may be configured to transmit and receive wireless signals to communicate with one or more temperature and/or humidity sensors in one or more climate zones of the facility. The controller may be configured to compare the temperature of the lens and any of the climate zone temperatures to calculate a differential temperature value. The differential temperature may then be used to determine, for example, when to turn the heating element on, how much power or heat to be provided by the heating element, when to turn the heating element off, and/or how much to reduce the power or heat provided to the lens by the heating element. The lens heater controller can further be used to determine an exact location of the lens relative to one or more climate zones and/or one or more temperature and humidity sensors.

In some implementations, a heated lens is provided in a camera. The camera may be fixed to a vehicle that moves through a warehouse, such as a forklift or cart. The lens can be heated by directing heat generated by one or more components of the vehicle to the lens using a thermally conductive material such as copper or wire. In this manner, the lens can act as a heat sink that absorbs at least some directed heat from the vehicle. By absorbing such heat, the lens may be maintained at a sufficiently high temperature to prevent the formation of condensation when the lens is moved from a colder to a warmer environment. Additionally, depending on the amount of heat directed away from the vehicle components, the technique may diminish the risk of overheating on the vehicle, thus providing an efficient heat transfer from one or more vehicle components to one or more lenses or other surfaces for which condensation is to be avoided. The heat-generating components of the vehicle from which heat is directed toward the lens can be, for instance, processor(s) of a computer system of the vehicle, processor(s) of a camera system on the vehicle, a motor or engine of the vehicle, a braking system of the vehicle, or a combination of these and/or other components. The controller of the heater system may determine (e.g., based on temperature differentials and/or ambient humidity levels) when and how much heat to apply to a lens to prevent condensation. If the processor determines that the amount of heat required is less than or equal to the amount of excess heat that can be re-directed from the vehicle components, then the processor can redirect the excess heat from the vehicle components directly to the lens to prevent condensation on the lens. On the other hand, if the controller determines that the amount of heat required to sufficiently heat the lens would be more than the amount of heat that could be supplied from the vehicle, then the controller can direct heat from the vehicle components to the lens and additionally activate a supplemental heater required to prevent condensation on the lens. Heat can be channeled from a heat source to a lens using conductors, such as a specifically shaped metallic component. The conductors may be insulated along their lengths to prevent heat dissipation.

In some cases, where the lens is located too far from a source of excess heat (e.g., the lens is placed on a top rack of a forklift and the excess heat is coming from an engine of the forklift) a heating element, such as a nichrome wire, can be used to thermally transmit the excess heat from the source to the lens. In addition, the heating element can come in contact with the lens to heat it with the excess heat.

In another example, a heater can be applied to one or more lenses of an augmented reality headset for use in a warehouse environment. The augmented reality headset can be used to assist the wearer in locating items placed in storage, for instance. The headset can further be used for efficient navigation through the warehouse or different climate zones. The lens in an augmented reality headset can be automatically heated in advance of entering a climate zone with a higher temperature than a zone where the lens is current located, thereby preventing the lens from fogging so that the user can continue performing his/her work efficiently.

In some implementations, the controller in the lens heater system may be programmed to activate one or more heating elements based on determining that the lens is located within a pre-defined distance from another climate zone where it is anticipated that the lens will enter. For example, the controller may monitor a distance between the current location of the lens (or the current location of a proxy object such as the vehicle, eyeglasses, camera system or user that moves with the lens) and locations of one or more climate zones (e.g., locations to the entrances of the climate zones). When the distance to a given climate zone falls to or below a threshold, the controller may activate the heating element to raise the temperature of the lens in anticipation of entering another climate zone and thereby prevent the lens from fogging if and when it enters that zone. The threshold distance may be static or dynamic, and may be set based on different variables. For example, a larger threshold distance may be employed where the temperature differential between the current climate zone and target climate zone is larger, and a smaller threshold distance may be employed where the temperature differential between the current climate zone and the target climate zone is smaller. In this way, when the temperature differential is larger, the heating element may be activated sooner to allow additional time for heat to raise the temperature of the lens sufficiently above the dew point for the target climate zone. Additionally or alternatively to adjusting the threshold distance, the heating profile (e.g., the level of power or heat applied) can be adjusted based on the temperature differential between the current climate zone of the lens and the target climate zone.

In some implementations, signals other than or in addition to distance can be used to predict the location (e.g., a target climate zone) where a lens will travel (and optionally, to predict a time when the lens may enter a new climate zone). For example, the system may identify a trajectory of the lens (or a trajectory of a proxy object that travels in coordination or fixed manner with the lens), a historical travel pattern of the lens (or a historical travel pattern of a proxy object), a navigation route or plan of the lens (or a navigation route or plan of the proxy object), or a combination of these and/or other factors to predict a target climate zone where the lens will travel. Based on this prediction, the system may determine whether, when, and how to heat the lens to avoid formation of condensation when the lens enters the target climate zone.

In some implementations, a buffer zone may be defined around a climate zone in a map of a facility. The buffer zone may be uniformly sized around climate zone, or may be non-uniform (e.g., a boundary of the buffer zone may be drawn at different distances from a center or periphery of the climate zone at different points). The heating system may access the map and compare the location of the lens to the buffer zones of one or more climate zones. If the lens is located within the buffer zone for a particular climate zone, the heating system may activate the heating element to begin heating the lens (or may increase an intensity of the heat applied to the lens). In some examples, multiple overlapping buffer zones can be defined around a climate zone. As the lens moves increasingly closer to the climate zone and passes through increasingly closer buffer zones (e.g., moves from "outer-ring" buffer zones to "inner-ring" buffer zones), the heating system may apply increasingly greater levels of heat to the lens as the confidence that the lens will actually enter the new climate zone increases as the proximity of the lens to the entrance of the climate zone increases. Similarly, if the lens moves further from the entrance to a warmer climate zone, the heating system may gradually decrease the intensity of heat applied to the lens (e.g., by decreasing an amount of electrical current flowing through a heating filament and/or directing less excess heat from external vehicle components to the lens). The amount of increased or decreased heating can be a function of distance to the entrance of a target climate zone (or another location in or associated with the target climate zone such as a center point of the target climate zone or a location of one or more temperature and/or humidity sensors within the target climate zone) and/or a likelihood (e.g., a probability) that the lens will move to the target climate zone within a certain amount of time (e.g., 5 seconds, 15 seconds, 30 seconds, 1 minute, 2 minutes, 5 minutes) based on any of the factors previously described.

Temperature sensors, humidity sensors, or both, can be installed at various locations in a facility across one or more climate zones to collect temperature and humidity measurements on a continuous or periodic basis. In some implementations, all or some of the sensors are configured to communicate their measurements to a central monitoring station. The central monitoring station may be implemented within the same facility as the sensors with which it communicates or at another location (e.g., a cloud server) remote from the facility. Communication between the sensors and the monitoring station may occur over wired or wireless channels. In some implementations, wires directly connect sensors to the monitoring station thereby allowing the monitoring station to directly detect signals emitted by the temperature and/or humidity sensors. In some implementations, the sensors may include communication interfaces to facilitate communication with the monitoring station and/or other devices (e.g., lens heater controllers). Some elements of the system may be integrated with the facility's heating, ventilation, and air conditioning (HVAC) system, such as temperature sensors employed in thermostats for one or more climate zones of the facilities. These same sensors may be employed by the lens heater system to monitor temperatures in one or more climate zones.

Turning to FIG. 1, a warehouse facility 102 is depicted having multiple climate zones 104, 106, 108, and 110. The various climate zones 104, 106, 108, and 110 can be maintained at different temperature dependent on the type(s) of goods stored and activities that take place therein. For example, climate zones 1-3 (104, 106, 108) may be storage areas for dry, refrigerated, and/or frozen goods. The warehouse 102 may further include a docking area 110 as a fourth climate zone, which can be kept at a higher average temperature than at least some of the storage areas 104-108. Incoming or outgoing goods from the warehouse 102 may be staged in the docking area 110 prior to being shelved in a storage area (for incoming goods) or prior to being loaded on a delivery truck (for outgoing goods). The dock area 110 can be maintained at a warmer temperature because it is exposed to outside elements, especially when trucks or other vehicles deliver and pick up items that are stored in the warehouse.

Due to differences in ambient temperatures that exist throughout the warehouse 102, lens fogging can become a significant issue impeding work and facility efficiency. For example, when unloading an incoming shipment of goods, a forklift 112 may travel between the dock area 110 and one or more of the storage area climate zones 104-108 to deliver those goods for storage. Consider a scenario where the dock area 110 is maintained between 40-50° F. and the storage area climate zones 104-108 are at 20° F., 10° F., and 0° F. respectively. A camera mounted on the forklift 112 or eyeglass lenses of the forklift operator may experience lens fogging as the forklift 112 moves from one climate zone to the dock area 110. If the forklift 112 makes repeated trips between climate zones 104-110, the lenses may frequently fog and may even remain fogged for substantial periods of time as the lens temperature is never afforded adequate time to rise above the dew point.

The lens heater system can also be equipped with a wireless communication system and/or communication interface to communicate with a monitoring system, a warehouse management system, and/or one or more temperature and humidity measuring devices located at each of the climate zones 104-110 in the warehouse 102. These devices can then send and receive information about the warehouse that includes but is not limited to: a location of the lens on the forklift 112, a location of each of the climate zones 104-110, a temperature and/or humidity measurement of the lens, a temperature and/or humidity measurement of each of the climate zones 104-110, and a temperature and/or humidity measurement of the dock area 110. This real-time communication can ensure the lens heater system accurately determines if, for how long, and how much heat should be applied to the lens and optimal times when to activate and/or turn on the heat element.

For example, the lens heater system may identify a location of the lens on the forklift 112 that indicates the lens will be in a cold area of the warehouse for an extended period of time. In response, the lens heater system may select to deactivate or turn off the heater element while the lens is located within the cold area. Once the lens heater system receives an updated location of the lens on the forklift 112, and that location is nearing a threshold (e.g., border) between the cold area of the warehouse and another climate zone with a different temperature, then the lens heater system can select to activate or turn on the heater element before the lens crosses the threshold. As a result, as the lens on the forklift 112 crosses the threshold and changes climate zones, the lens may be prevented from fogging, thereby allowing the lens to move seamlessly between different climate zones 104-110 without condensation/fogging interfering with a view through the lens. In another example, if the lens heater system receives a location of the lens on the forklift 112 that indicates the lens will be in a cold zone of the warehouse for just a short time before returning to a warmer climate zone, the lens heater system may select to leave the heater element activated or turned on during the lens's entire time in the colder zone (e.g., rather than first deactivating and later re-activating the heater element) and therefore running at a lower power setting. In this way, the lens heater system may conserve power by avoiding the need to re-heat the lens from a lower temperature that would have resulted if the heater element had been deactivated for a time. On the other hand, if the system predicts that the lens will remain in a colder climate zone for at least a threshold amount of time, the controller may deactivate the heater element and only reactivate it a short time before the lens is predicted to leave the colder zone and enter a warmer zone. Because the lens is exposed to the colder environment for a longer time in this latter example, deactivating the heater element may be the more energy-efficient option.

In the example scenario shown in FIG. 1, at time $t_1$, the forklift 112 is initially located in the dock area 110, which is maintained at a temperature between 40-50 degrees F. The forklift 112 is tasked with dropping off items (e.g., pallets of frozen food) in climate zone 3 (108), which is kept at a lower temperature of 0° F. The lens heater system can communicate wirelessly (e.g., BLUETOOTH, WIFI) and directly with the forklift 112 or a warehouse management system to receive information about tasks the forklift 112 will perform. This information can be used by the lens heater system to determine a manner of heating the lens. For example, the lens heater system can receive information about which climate zones 104-108 the forklift 112 will be entering, and in which order, based on the tasks the forklift 112 (or the operator of the forklift 112) is assigned to carry out, how long it will take the forklift 112 to move between each of the climate zones 104-108, and how long the forklift 112 will be in each of the climate zones 104-108. The lens heater system can also receive real-time updates about the progress of the forklift 112 in carrying out tasks so that the lens heater system can automatically adjust calculations and decisions relating to the activation, deactivation, and/or monitoring of the lens heater.

The lens heater system determines that, between times $t_1$ and $t_2$, the lens of a camera or other device included with the forklift 112 is to be heated to avoid fogging upon entry into the climate zone 3 (108). While the forklift 112 is in the dock area 110, the lens heater system can identify a temperature of the climate zone 3 (108). The temperature may be pre-programmed into the lens heater system (e.g., in a data structure stored in memory of the system that correlates climate zones with temperature and/or humidity information for each zone). In some implementations, the lens heater system may request and receive real-time temperature and/or humidity values for the dock area 110 and climate zone 3 (108) from sensors located in the dock area 110 and climate zone 3 (108). The temperature and/or humidity conditions of the climate zones can also be obtained from a monitoring station or other external warehouse management system. For example, the monitoring station or warehouse management system can maintain and access a database that stores real-time temperatures of the dock area 110 and each of the climate zones 104-108 in the warehouse 102. In addition to identifying real-time temperatures (and, optionally, humidity values) for the current and target climate zones, the system can also obtain a real-time temperature value for the lens based on measurements from one or more temperature sensors coupled to the lens. The lens heater system can determine a difference between the temperature of the dock area 110 and the climate zone 3 (108), and then compare that difference to the temperature of the lens. Based on such comparison, the lens heater system can determine how much heat to supply to the lens to prevent fogging, how long the heat should be supplied to the lens, and when to apply the heat, for example.

Because the forklift 112's first move is to travel from a warmer climate zone (dock area 110) to a colder climate zone (storage area 108), the lens heater system may determine that no lens heating is necessary to prevent fog formation because lenses traveling with the forklift 112 will generally not fog as a result of moving to a colder environment.

In some cases, the lens heater system may deactivate or turn off the lens heating element while in a certain climate zone, and the lens may begin to fog at some point thereafter while in the same climate zone. Using real-time updates of a temperature value for the lens, the system can automatically activate or turn on the lens heater at an appropriate time before the lens begins to fog. For example, the system may monitor changes in the temperature of the lens and/or the climate zone (and, optionally, changes in the ambient humidity of the climate zone), and determine a time when the temperature of the lens may fall below the dew point. The controller of the lens heater system may activate the heater element before the predicted crossing of the dew point to prevent the lens from fogging.

Once the forklift 112 completes its task in climate zone 3 (108), its next task may involve actions in the storage area for climate zone 2 (106). Based on information received from the forklift 112 and/or the warehouse management system, the lens heater system can determine a time interval between times $t_2$ and $t_3$ to be able to heat the lens and avoid fogging. As the forklift 112 moves from climate zone 3 (108) into dock area 110, the lens heater system may activate the heating element at a high power setting to counteract the large differential between temperatures of the climate zone 3 (108) and dock area 110. In some implementations, the controller activates the heating element in advance of the forklift 112 and the lens moving into the warmer dock area 110 based on a prediction that the lens will be entering a warmer environment. In other implementations, the controller constantly monitors temperature parameters of the lens's environment and of the lens itself (and, optionally, ambient humidity parameters), and upon detecting a lens temperature below the dew point activates the heating element until the lens is sufficiently heated above the dew point (e.g., by a threshold amount). In such implementations, the controller may not predict movement of the lens in advance to different climate zones, but instead immediately reacts to changes in temperature and/or humidity values that indicate the lens is likely to form fog or has formed fog from water condensation in the environment. In some implementations, the controller may use first, second, and/or third order changes in temperature and/or humidity values to determine when to activate, deactivate, or adjust a heat/power setting of the lens heating element, e.g., to prevent fogging before it occurs based on real-time measurements or to more quickly mitigate fogging.

Based on the information received from the forklift 112 or the warehouse management system regarding the progress of the forklift 112 in completing its tasks, the lens heater system can determine to activate or turn on the lens heating element once the forklift 112 exits climate zone 3 (108) and enters the dock area 110. As a result, the system can determine to activate or turn on the lens heater at a high power setting while in the dock area 110 to counteract the temperature differential between the climate zone 3 (108) and dock area 110. Once the lens heater system determines the lens is at a temperature that will not result in fogging while the forklift 112 is in the dock area 110, the system can automatically deactivate or turn off or reduce the lens heater from a high power setting to a low power setting to counteract the temperature differential between the dock area 110 and the climate zone 2 (106). The change in power settings and heat delivered to the lens can occur seamlessly and automatically as the lens heater system receives real-time updates on temperature values of the lens, a current climate zone, and a second climate zone, and information pertaining to the performance or progress of the forklift 112 in completing its tasks.

At time $t_3$, the forklift 112 enters storage area climate zone 2 (106). The lens heater system can similarly use environmental and lens temperatures, as well as ambient humidity levels, to determine times to activate or deactivate a heater element to heat the surface of the lens and prevent or mitigate condensation/fogging, and heating intensities while the heater element is activated. If the climate zone 2 (106) is colder than the dock area 110, there may be no need to activate the heater if the lens temperature upon entering zone 2 (106) would not fog in any event.

Figure 2:
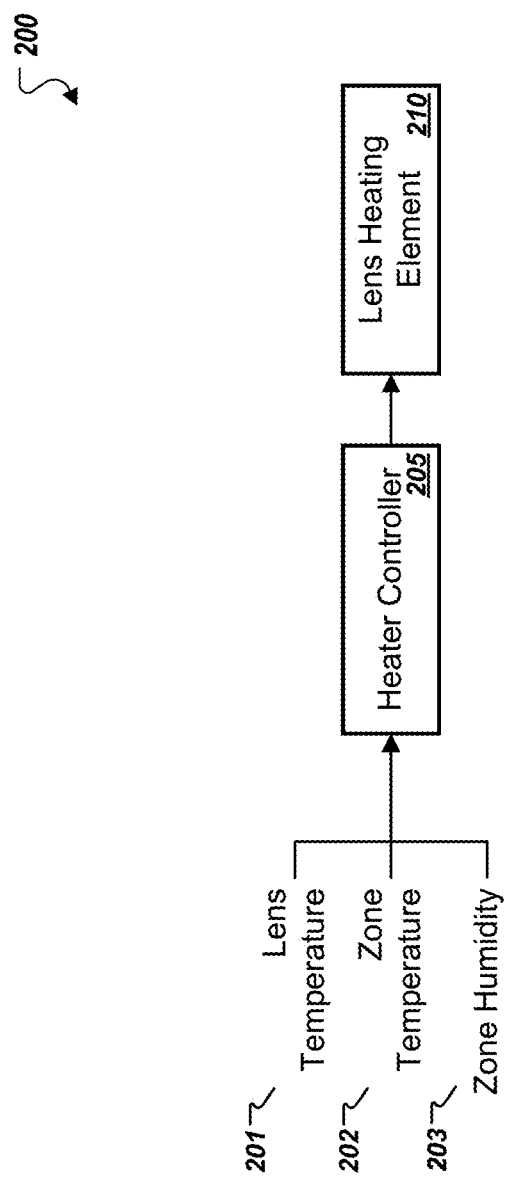
FIG. 2 depicts a camera mounted on a forklift.

FIG. 2 depicts an example operation flowchart 200 for a controller 205 of a lens heater system. The controller may be implemented using one or more computer processors or other data processing apparatus in one or more location. The heater controller 205 can receive inputs that include a lens temperature 201, an ambient temperature 202, and an ambient humidity level 203. The ambient temperature 202 and ambient humidity level 203 can respectively indicate the temperature and humidity in the ambient environment of a current location (e.g., a climate zone within a facility) of the lens or the temperature and humidity in the ambient environment of a target location where the lens is predicted to travel within a specified amount of time (e.g., a target climate zone within a facility). These inputs can be received from one or more temperature and humidity sensors and/or a monitoring station, as previously discussed. In addition, the heater controller 205 can receive automatic, real-time updates for each of the inputs (e.g., temperature/humidity values are pushed to the controller 205 on a periodic and continuous basis). In another example, the heater controller 205 can request updated inputs at particular times or on a periodic and continuous basis from the sensors and/or monitoring station. In some examples, the heater controller 205 can receive one or more zone temperatures 202 and zone humidity values 203 based on a current climate zone the lens is located in and a second climate zone that the lens will be moving into.

Based on inputs 201-203, controller 205 determines operational parameters for the lens heating element 210. The operational parameters can include, for example, a time to activate the heating element 210, an intensity of heat to apply to the lens with the activated heating element 210 (e.g., a power or heating level), changes in the intensity of heat to apply to the lens with the activated heating element 210 over time, and a time to de-activate the heating element 210. The controller 205 converts the operational parameters to control signals that are used to control the heating element 210 according to the determined operational parameters. The lens heater 210 can use the control signals to heat the lens accordingly and prevent, reduce, or eliminate fogging. Example control signals received from the heater controller 205 can include electrical signals (e.g., current or voltage levels) that directly power the heating element 210 at levels proportionate with the electrical signal, signals to activate or de-activate power switches that couple/de-couple the heating element 210 from a power source, signals to control the ramp rate of the lens heater 210, a length of time to leave the lens heater 210 activated or turned on, signals that instruct a timer to activate/deactivate the heating element 210 at specified times, signals that indicate an intensity at which the heat should be delivered through the lens heater 210 and to the lens, and signals that identify a selection of one or more of a set of available heat sources from which the heating element 210 should or will generate or direct the heat from (e.g., a heating filament, an external computer processor, or other heat generators). Over time, the lens heater 210 can receive one or more updated outputs in real-time from the heater controller 205 to automatically make necessary adjustments to the heat delivered to the lens.

Figure 3:
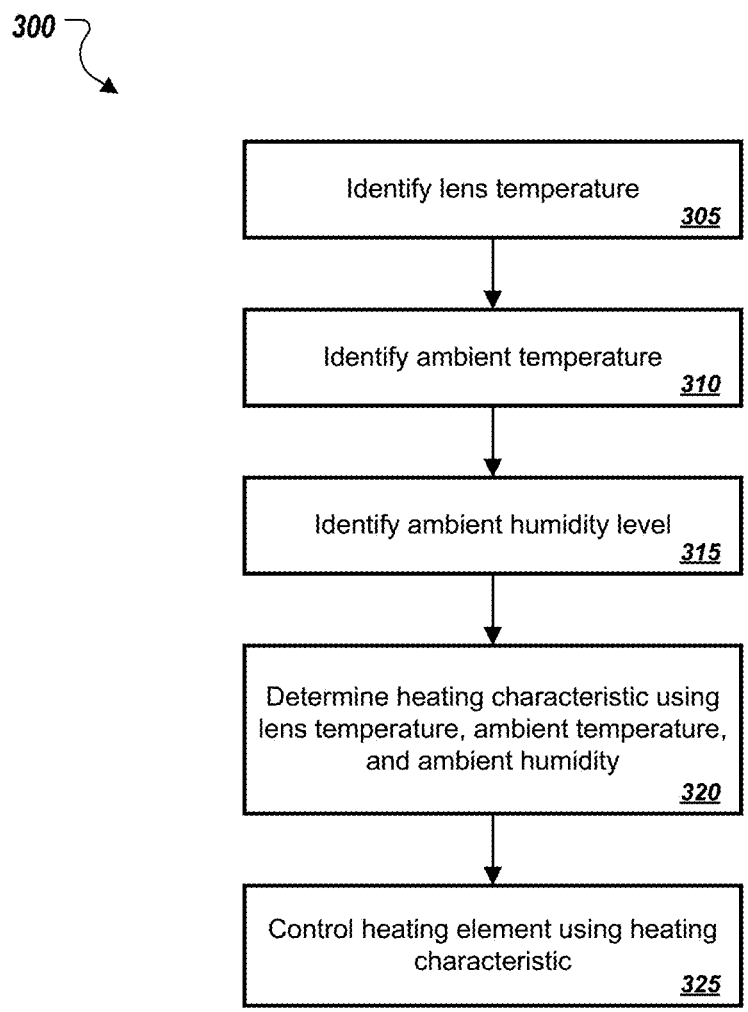
FIG. 3 depicts a heater element affixed to the lenses of an augmented-reality headset.

FIG. 3 is a flowchart of an example process 300 for controlling a heating element in a lens heater system. At stage 305, the lens temperature is identified using a temperature sensor coupled to the lens, as previously discussed. The temperature value is communicated to the heater controller for use in determining one or more heating characteristics specific to the lens.

At stage 310, one or more temperature sensors in a climate zone that the lens is currently located in or will be moving into can detect an ambient temperature of the respective climate zone. In some examples, when the temperature gradient across the climate zone varies, multiple temperature measurements at different locations within the climate zone can be taken and used to determine a combined (e.g., averaged) temperature value for that climate zone. The temperature measurement is then communicated to the lens heater controller for use in determining operational parameters for a heating element of the lens heater system.

At stage 315, one or more humidity sensors in a climate zone that the lens is currently located in or will be moving into can detect a humidity level of the respective climate zone (315). The one or more measured humidity levels can be communicated to the lens heater controller as a data point for use in determining heating characteristics specific to the lens.

At stage 320, measurement values obtained in the previous stages of the process 300 (305-315) can be used by the lens heater controller to determine the heating characteristics of the lens heater that are specific to the lens (e.g., to determine operational parameters for the heating element(s) that apply heat to the lens). For example, in some situations the heating characteristic can be a slow ramp from off or a deactivated state to a low power state or setting if the controller determines that the lens does not require much applied heat to prevent or remove fogging. In other examples, the heating characteristic can be a sharp turn on or activation in order to rapidly heat the lens and remove fogging as the fogging is occurring. In another example, the heating characteristic can be maintaining the lens heater at a constant low power setting or otherwise maintaining a current state of the lens heater in order to continuously ensure that the lens does not fog up. At this stage, the controller determines the heat characteristics specific to the lens based on one or more of the received lens temperature, ambient temperature, and ambient humidity. If, for example, the controller determines that there is at least a threshold difference between the lens temperature and the ambient environmental temperature (e.g., of either the current environment or an environment that the lens is predicted to travel to), the controller can determine that the intensity of heat applied to the lens should be increased to a high power setting to counteract fogging on the lens. In another example, if the controller determines that there is a slight or small difference between the lens temperature and the ambient temperature but there is a significant level of ambient humidity, the controller can determine that the lens heater should be activated or turned on a low power setting and provide continuous heat to ensure the lens don't fog up from the temperature differential but also so condensation doesn't form on the lens as a result of the high level of ambient humidity. In general, the controller may determine whether to apply additional heat to the lens by setting thresholds based on any suitable method of determining the dew point of an environment. For example, the controller may employ the Magnus formula, the Arden Buck equation, or other suitable techniques for calculating the dew point. The threshold temperature for activating the heating element or otherwise increasing heat applied to the lens can be set at the dew point temperature or at some temperature above the calculated dew point. The higher the threshold is set above the dew point, the greater confidence the system can have that condensation/fogging will be mitigated. But as the threshold is set closer to the dew point, the system may conserve power by avoiding unnecessary heating. The threshold may therefore be set so as to optimize efficiency and efficacy between these two factors.

At stage 320, the controller obtains updated measurements, such as newly recorded lens temperature, ambient temperatures, and/or ambient humidity levels. Using these updated measurements in real-time, the heater controller can continuously determine and update one or more of the heating characteristics that are specific to the lens.

Next, the heating element (e.g., heater) can be controlled by the lens heater controller and according to the one or more heating characteristics specific to the lens. Accordingly, the lens can be heated by a heater that receives heat from an external heat source, such as motor or engine of a forklift or other warehouse vehicle, as previously discussed. In other examples, the lens can be heated by excess heat from a computer processor. Any heat source (e.g., heater, heating element) that can be routed to the lens and adequately controlled by the lens heater controller to prevent overheating can be used for lens heating and in accordance with the one or more determined heating characteristics specific to the lens. In some implementations, the heat source can be a heating filament or similar material that is integrated into the lens and/or appended or tethered to the lens.

For example, the lens heater can be integrated into an augmented reality headset or other headwear (e.g., eye glasses), to ensure ease of mobility. This arrangement can also ensure that the wearer is not distracted or discomforted by the lens heater while performing tasks. In other words, if the lens heater is integrated into the wearable device, then the wearer may not feel the heat as it is delivered through the heater and to the lens. In other examples, the heat source can be located in close proximity to the lens rather than directly on the lens. In addition, the heat source can receive energy and/or heat from a battery pack that is attached to the heat source, the lens, or any other device in close proximity to the heat source.

Figure 4:
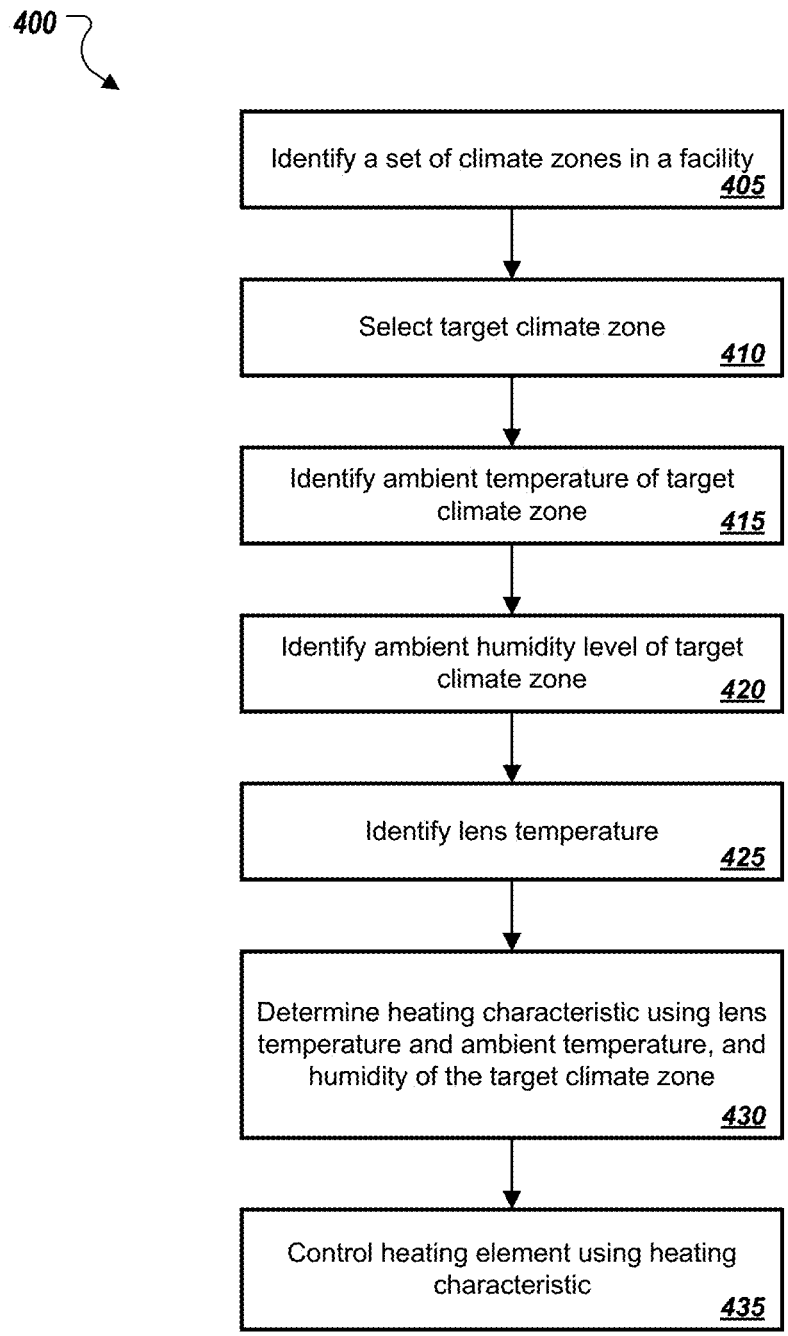
FIG. 4 depicts a warehouse incorporating multiple climate zones.

FIG. 4 is a flowchart of another example process 400 for controlling a lens heating element. At stage 405, a controller of a lens heater system identifies one or more climate zones of a facility (e.g., a cold-storage warehouse). The climate zones may be defined in maps or other data structures that indicate, for example, locations of the boundaries of the climate zone within the facility. The system may identify the climate zones by accessing known locations in memory of a computer system where files regarding the climate zones are maintained, by requesting information about the climate zones, or both. For example, maps and/or drawings of a facility divided into climate zones can be generated by a facility management system by using a computer-aided drafting program and/or information acquired from one or more vehicles and/or mapping devices and systems in the facility.

At stage 410, the controller selects a particular climate zone from among one or more climate zones in the facility as a target climate zone. The target climate zone can be the next and/or final destination for the lens as it travels through the facility. Once the target climate zone is selected, the controller obtains temperature and/or humidity measurements from that climate zone (stages 415 and 420). The temperature and/or humidity measurements can be determined using one or more temperature and humidity measuring devices (e.g., sensors) in the climate zone. The lens heater system can use the temperature and/or humidity measurements to determine one or more heating characteristics to apply specific to the lens.

In some implementations, an operator of the facility or a particular device containing the lens can select the target climate zone as the zone with the highest temperature and/or humidity measurement in the facility among all or a subset of the climate zones in the facility. In this manner, the system can be configured to continuously heat the lens to a degree that would prevent fogging/condensation from forming on it regardless of the climate zone that the lens were located in at any given time. For example, the controller can determine a threshold corresponding to the dew point of the climate zone with the highest dew point, and can ensure that the lens is maintained at a temperature above this threshold or dew point. In some implementations, setting the target zone as the zone with the highest temperature can provide a baseline for heating characteristics whenever the lens is not moving between zones. In other examples, the target zone can be set as the zone in which the lens spends the most amount of time and then any heating characteristics that are determined specific to the lens can be changed based on a temperature differentiation between that target zone and any other zone that the lens will be moving into. In yet other examples, the target or baseline zone can be set as the dock area of the facility, which is often kept at an ambient, neutral temperature.

The temperature and humidity of the climate zone can be communicated to the heating controller of the lens heater system using a wired and/or wireless communication network (e.g., BLUETOOTH, WIFI). In addition, the controller can receive a temperature measurement of the lens in real-time from a temperature measuring sensor or other device attached to the lens (stage 425). The temperature measurement of the lens can be used in determining the one or more heating characteristics that are specific to the lens. In other examples, the lens temperature can be derived from historical data as determined based on the lens' movement throughout the facility. For example, if the lens does not have a temperature measuring sensor, then the lens heater system can estimate the temperature of the lens based on the temperature of a zone that the lens is in at any given time. For example, if the lens is in a zone with a temperature of 40° F. for a certain amount of time, the lens heater system can determine that the lens has a temperature of 40° F. The controller may use a function or other data that maps ambient temperatures to lens temperatures as a function of time to estimate the lens temperature.

At stage 430, the controller determines one or more heating characteristics specific to the lens based on using the ambient temperature of the target climate zone, the ambient humidity level of the target climate zone, and the lens temperature. The controller can determine the heating characteristics as previously discussed. In addition, the heating element can receive power and/or heat that pulses on and off periodically to maintain a continuous low level of heat to the lens. This can be beneficial in situations where the lens spends a long time in one climate zone and requires a constant prevention of fogging. This can also be beneficial where the lens is moving between different climate zones that have very small differentials in temperature. In yet another example, the heating characteristic can include setting a lens temperature to always be kept at a certain and constant temperature, such as a highest temperature in the facility. In this example, the dock area of the facility can be kept at a stable temperature and the lens heater, heating filament, or other heat source can be configured to maintain the lens at the temperature of the dock area. In another embodiment, the temperature of the lens can be based off and maintained by historical data of the lens' movement throughout the facility. This can be advantageous if the vehicle, device, or person using the lens heater has a set operation schedule.

At stage 435, the heating element (e.g., filament, heat source) is controlled by the lens heater system and/or heater controller based on the one or more heating characteristics determined at stage 430. The lens can be heated based on any of the previously discussed heating arrangements. In addition, any heat source can be routed to the lens and adequately controlled by the lens heater system and/or heater controller to prevent overheating of the lens or discomfort to a person wearing the lens that are heated.

Figure 5:
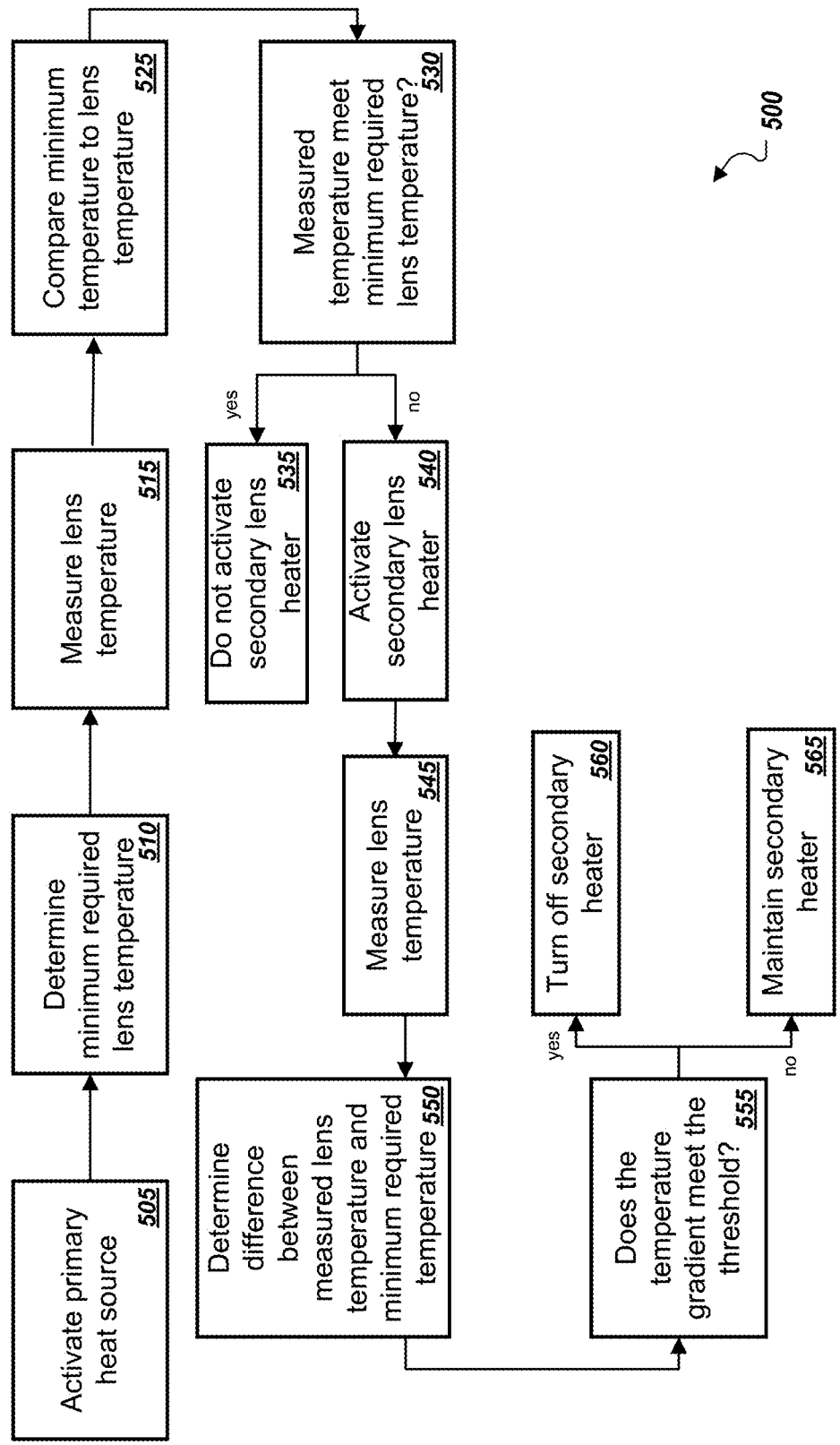
FIG. 5 depicts an example flowchart for a heater controller.

FIG. 5 is a flow diagram of an example process 500 for selecting a heating source to heat a lens or other object to prevent condensation or fogging. The process 500 can apply in some implementations where the lens heater system includes more than one heating elements (heating sources). For example, the system can include a primary and secondary heat source. The primary heat source can be the default source for most use of the heater system, while the secondary heat source can be activated as an alternative or as a supplemental source to augment the heat from the primary heat source when the amount of heat required to meet a heating objective (e.g., to heat the lens above the dew point within a certain amount of time) cannot be provided by the primary source alone or when the primary source is unavailable. This can occur, for example, when there is a sufficiently large temperature differential between the lens temperature and the ambient temperature of a target climate zone. In other examples, the secondary heat source can be used when the primary heat source no longer has a power supply and/or battery and is thus unavailable. As a result, the secondary heat source can act as a backup heat source. In some examples, the primary and secondary heat sources can be used simultaneously, especially where the lens temperature has a very large temperature differential with the ambient temperature of the target climate zone. In yet another example, the primary and secondary heat source can be used at the same time where both are set at low power settings to deliver a supply of constant heat to the lens. The primary and secondary heat sources can be arranged in such a way that the battery or other power supply of each heat source is conserved and not greatly depleted.

Example primary heat sources can include but are not limited to a nearby engine that generates excess heat while in operation or an electronic device that provides a constant heat source, such as a computer processor. The primary heat source can further be coupled to the lens thermally or by a heating filament, such as a metal wire, resistance wire, Copper, or Nichrome. The secondary heat source can include but is not limited to a filament or other heat source as previously discussed. The secondary heat source may not always be constantly used, available, activated, or turned on. In the example of a wearable augmented reality headset, the primary heat source can be attached to a bottom portion of the lens of the headset while the secondary heat source can be attached to an upper portion of the lens.

At stage 505, the controller activates the primary heat source to provide the lens with a first source of heating. The primary heat source can be configured to operate for an amount of time as required to heat the lens to a certain point and prevent condensation or fogging. The controller can determine the appropriate amount of time to operate the primary heat source based on one or more temperature measurements of the lens and the target climate zone, as discussed in this specification.

At stage 510, the system can determine a minimum required lens temperature. This temperature value can be determined based on a highest measured temperature value in the facility or a temperature of a climate zone in which the lens is currently located in or will be moving to. In some implementations, the controller determines the minimum required lens temperature as the highest dew point among the climate zones in which the lens is currently located or will be located. The minimum required lens temperature can also be set above the dew point to provide additional assurance that the lens will be sufficiently heated to prevent fogging.

At stage 515, the lens heater system (e.g., the controller) detects a lens temperature. This temperature can be measured using one or more temperature sensors or other devices attached to the lens and/or in close proximity to the lens. The temperature can be measured while the primary heat source is operating (e.g., activated, turned on). For the temperature measurement to be as accurate as possible, it may be advantageous to locate the temperature measuring device a predetermined distance from the primary heat source, such that the temperature measuring device does not inadvertently record the temperature of the primary heat source.

At stage 520, the lens heater system (e.g., controller) compares the current lens temperature to the minimum required lens temperature (target lens temperature). If the current lens temperature meets at least the minimum required lens temperature, the system may be programmed to maintain the lens temperature at its current value (or even allow the lens temperature to decrease to the minimum required temperature) because the lens will not fog at the minimum required temperature. If, however, the current lens temperature does not meet the minimum required lens temperature, then the controller may determine operational parameters (e.g., heating characteristics) for the heating element that will raise the current lens temperature to at least the minimum required temperature. In some examples, the minimum required temperature can be a range of temperatures rather than a definite number. As a result, the lens heater system would compare the lens temperature from stage 515 to the range of minimum required temperatures to determine if the lens temperature falls within the range. If the temperature is within the range of minimum required temperatures, then the system may determine that no heat needs to be applied to the lens or a minimum amount of heat set at a low power setting should be applied to maintain the current temperature of the lens and prevent fogging.

If the lens heater system (e.g., the controller) determines that the measured lens temperature meets the minimum required temperature (stage 530), then the lens heater system can be configured to maintain the primary heat source's activation without activating the secondary heat source (stage 535). Once the lens heater system makes this determination, it can repeatedly perform the operations from stages 510-530 to ensure that the lens temperature remains at the optimal temperature as the lens moves throughout the facility and enters zones with different temperatures.

If, at stage 530, the lens heater system (e.g., the controller) determines that the minimum required temperature is not met by the primary heat source, then the system can be configured to activate or turn on the secondary heat source at stage 540. Activating the secondary heat source can include connecting the secondary heat source to the lens or automatically turning on the secondary heat source. Once the secondary heat source is activated, it can activated for a defined period of time, or until the temperature of the lens matches the minimum required temperature or falls within the range of the minimum required temperature. In addition, the secondary heat source can be activated for a period of time based on the one or more heating characteristics specific to the lens and previously determined by the lens heater system.

At stage 545, the lens heater system (e.g., the controller) identifies an updated lens temperature that is measured once the secondary heat source is activated. The system can receive one or more new temperature values for the lens in real-time, while the secondary heat source is running.

As the lens heater system receives the one or more new lens temperature values, at stage 550 the system can then determine a difference between the one or more new lens temperatures and the minimum required temperature. This step can be accomplished in a manner similar to what was described at stage 530.

Once the lens heater system determines a difference between the lens temperature and the minimum required temperature, the system can determine whether the difference is within a threshold temperature range (step 555). The threshold temperature range can indicate one or more temperatures at which the lens can be maintained at without fogging up.

If the lens temperature is within the threshold temperature range, then the lens has been adequately heated to meet the temperature threshold, and the secondary heat source can be turned off or deactivated (stage 560). In some implementations, the power to the secondary heat source can be reduced so that the secondary heater contributes minimal heating to the overall temperature of the lens. This can be beneficial where the lens temperature is within the threshold temperature range and needs to be kept within the range to prevent fogging.

If the lens temperature is not within the threshold temperature range, then the lens heater system can determine that the secondary heater remains activated or turned on (stage 565). The secondary heat source can remain activated until the lens heater system determines that the lens temperature falls within the threshold temperature range by performing the steps previously discussed (stages 545-555).

It should be noted that any of the steps in FIG. 5 can be repeated, either as a single step or as a set of steps, and until the lens has reached the minimum required temperature to avoid fogging or condensation. For example, after step 565, the lens heater system can be configured to wait a predetermined amount of time before performing step 545 and continuing through the flowchart to determine if the lens has met the minimum required temperature. In another example, if stage 560 is reached and the secondary heat source is turned off or deactivated, the lens heater system can be configured to wait a specified amount of time before returning to step 505 or 510 to ensure the lens does not fog up while moving into a different temperature zone in the facility.

Figure 6:
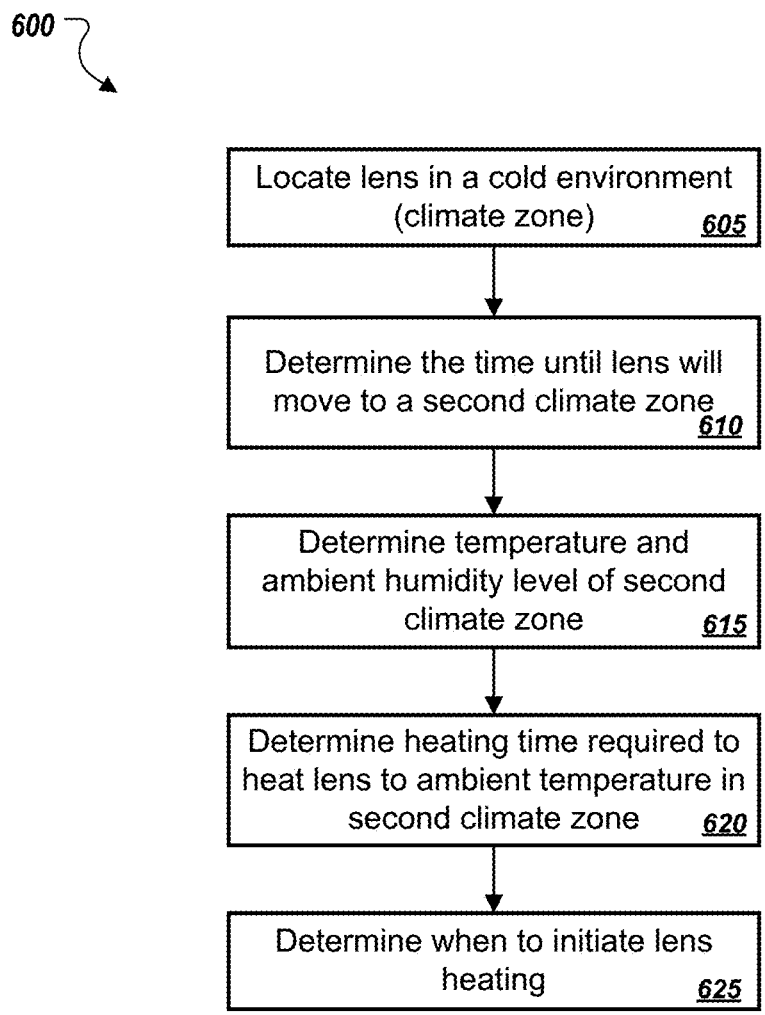
FIGS. 6-7 are flowcharts of example control algorithms for controlling a heating element.

FIG. 6 depicts a flowchart of an example process 600 for predictive heater activation. At stage 605, the lens heater system (e.g., the controller) identifies a location of the lens in a facility such as a cold-storage warehouse. For example, the lens may be located in a first climate zone that has a relatively low ambient temperature. The location of the lens can be determined in any suitable manner, such as by triangulation, a SLAM algorithm, GPS, real-time location services, systems based on radio frequency waves, acoustic waves, optical detection, or other suitable techniques.

At stage 610, the lens heater system (e.g., the controller) identifies a second climate zone that the lens is expected to travel to and how long before the lens is expected to arrive in the second climate zone. This can be determined, for example, based on receiving from the facility management system a predicted route for a warehouse vehicle which the lens is coupled with, historical data indicating average time that the warehouse vehicle and/or the lens spends in a certain climate zone, or any other factor. In another example, the facility management system can determine how long it will take for the warehouse vehicle coupled with the lens to move to the second climate zone and then transmit that determination to the lens heater system.

At stage 615, the lens heater system (e.g., the controller) determines at least one of a temperature or humidify of the second climate zone. At stage 620, the lens heater system (e.g., the controller) determines an amount of time required to heat the lens to a target lens temperature for preventing fogging of the lens in the second climate zone. In some implementations, the target lens temperature is the dew point of the second climate zone, or a temperature slightly above the dew point. In some implementations, the target lens temperature can be approximated as the ambient temperature of the second climate zone or a temperature slightly above the ambient temperature of the second climate zone. An estimate of the time required to achieve the target lens temperature can be based on modeled heating times and/or historical observations of times required to increase lens temperatures by various amounts. In determining the required heating time, the controller may account for different heating levels to conserve battery power.

At stage 625, the lens heater system (e.g., the controller) determines at what point in time to initiate lens heating (e.g., activating the heat source and/or ramping up the power setting of the heat source). In addition, the lens heater system can determine that the lens heating should start at a particular distance from the second climate zone. The system can determine that heating should start on the threshold of the second climate zone. In some examples, especially where there is a large difference in temperature between the first climate zone and the second climate zone, the lens heater system can determine to start, activate, or turn on the heat source while the lens is still in the first climate zone.

Figure 7:
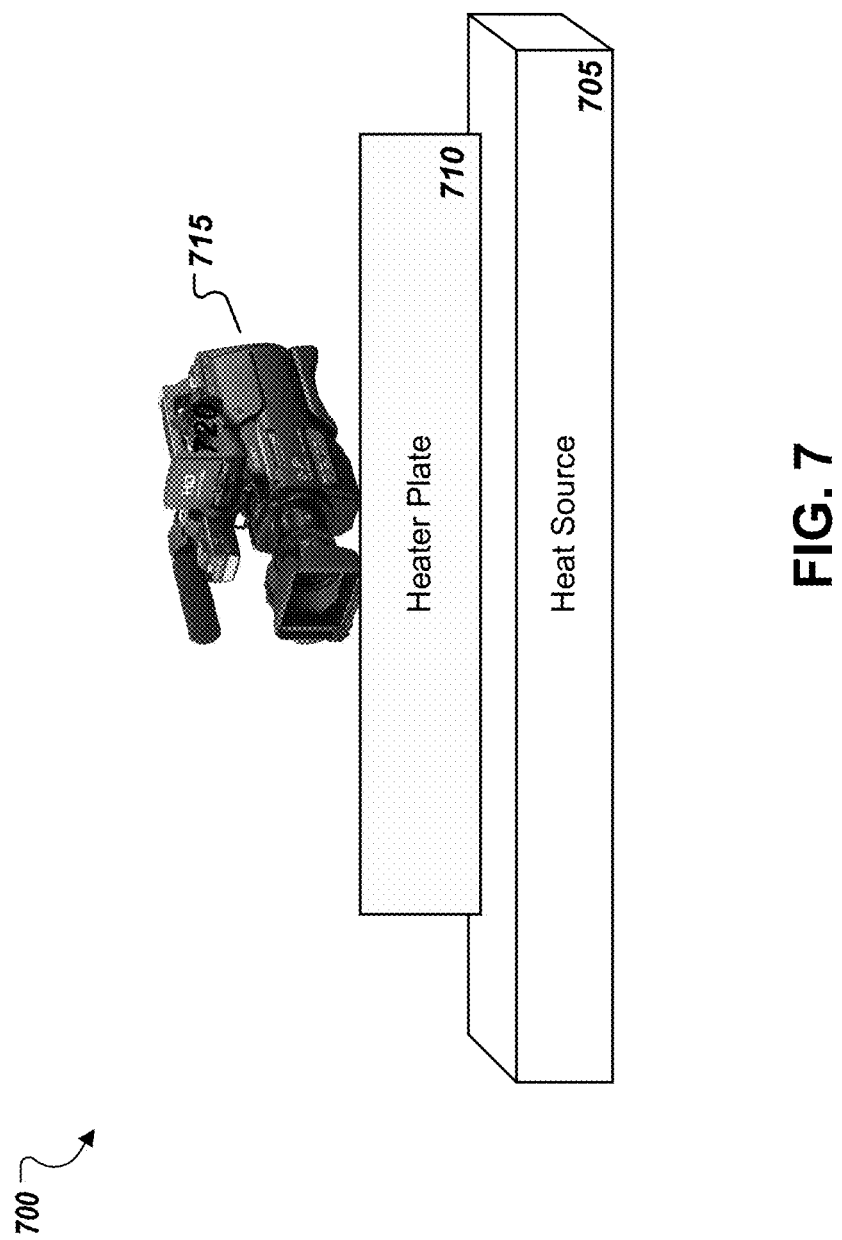

FIG. 7 depicts a camera 715 mounted on a heater plate 710 that abuts a heat source 705. The heat source 705 can be an active heating element, such as a heating filament, or any electronic or mechanical source that generates excess heat as a byproduct of another process such as a computer processor or vehicle motor/engine (e.g., a forklift motor). An external heating source 705 can further provide continuous heating of the lens. An example external heating source 705 can be an engine that generates excess heat, wherein the engine is some distance away from the camera 715 such that the heater plate 710 cannot conduct the heat from the engine and to the lens. Where an external heating source 705 is employed, the heat can be transferred to the camera 715 through a heating element, such as a Nichrome wire or filament. Other exemplary external heating sources can include but are not limited to a battery attached to a vehicle, such as a forklift, where the battery provides a power supply to the vehicle but simultaneously offers additional power supply to heat the camera 715.

The heater plate 710 conducts heat from the heat source 705 and transfers the heat to the lens of the camera 715 to prevent fogging. The heater plate 710 can be a constructed from metallic material and formed with fins, coils, or structures and materials that conduct heat. The camera 715 can be any type of camera depending on the desired image, such as a stereoscopic camera or regular camera. A lens heater coupled to the lens can comprise one or more temperature regulators, temperature measurement devices, and a power source, such as a battery.

The temperature measurement device can be situated in close proximity to the lens so that it can measure an accurate temperature value of the lens in real-time. To ensure an accurate temperature reading can be made for the lens, the temperature measurement device can be positioned on a part of the lens that is as far away as possible from the heat source 705 and/or the heater plate 710. The temperature measurement device can comprise one or more temperature sensors, such as a negative temperature coefficient (NTC) thermistor, a resistance temperature detector (RTD), a thermocouple, an infrared sensor, or a semiconductor-based sensor. Other temperature measurement devices can be placed in each climate zone of the facility so that the lens heater system can compare the temperature of the lens to the temperature of a climate zone that the lens is located in or near to determine whether or not the heating element should be activated to prevent fog or condensation on the lens.

Figure 8:
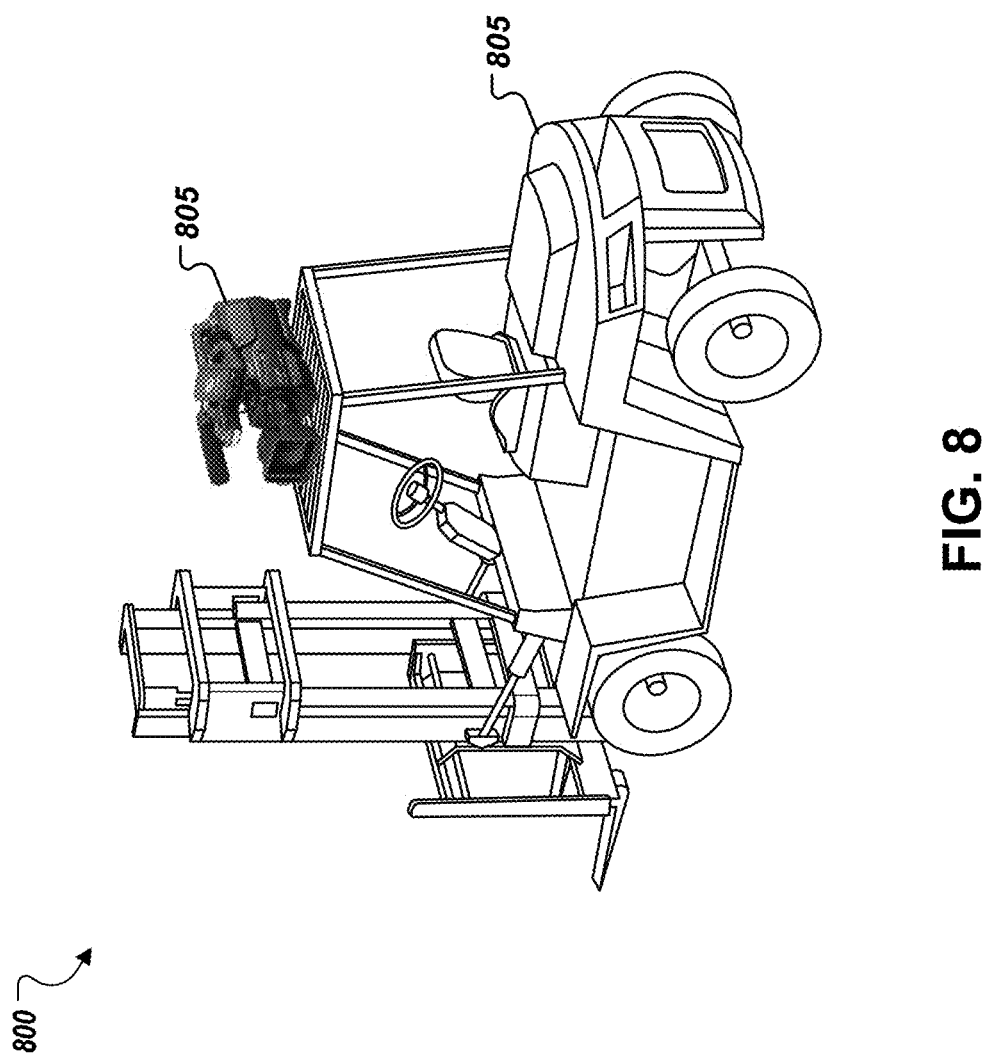
FIG. 8 is a flowchart for selecting a heating source.

FIG. 8 depicts a camera 805 mounted to a forklift 810. The camera 805 can be mounted anywhere that is convenient for capturing a desired image, such as on top of the cab, on a rack on top of the forklift, as depicted in the figure, or on either side of the body of the vehicle. The mounting location may depend on the type of vehicle the camera is mounted on and/or the purpose of the camera. For example, a lift mechanism of the forklift may interfere with front-facing images and/or video, so the camera may be placed on a rack on top of the forklift or cab. The camera may also be mounted on any type of vehicle suitable for operating in a warehouse or similar facility, such as a forklift, personnel carrier, tram, robot, or other utility vehicle.

In some implementations, the camera 805's lens can be thermally coupled to a motor or engine of the vehicle so that the lens can be heated by the heat generated from the motor/engine. The particular coupling method may depend on the location of the camera 805 and the type of vehicle that the camera 805 is mounted to. For example, if the camera 805 is mounted to the top of the cab, then it may require an elongated heating element, such as a Nichrome wire or other filament, to connect the camera 805 with a heat source that is not proximate to the camera 805. As a result of such arrangement, the heating element can transfer the heat to the camera 805, despite the distance between the camera 805 and the heat source. The forklift and/or camera 805 may further include a device that determines the camera 805's location in the warehouse or facility. In addition, the device can determine whether the camera lens should receive heat and provide for other accurate functionality of the lens heater system. The camera 805 may be powered by a battery. That battery can be attached to or part of the camera 805. In other examples, the camera 805 can be connected to a battery source that is external to the camera 805. That battery can, for example, be the battery source of the utility vehicle or any other device in proximity to the camera 805. To reduce power usage, the heater and/or heating element can be turned off when the lens heater system determines that the camera 805 does not require heating to prevent condensation or fog. For example, when the camera 805 is located in a warmer zone of the facility for a period of time, the lens heater system can determine that the camera 805 does not or no longer requires heating and therefore it can deactivate and/or turn off the heater and/or heating element on the lens until the lens heater system receives updated temperature measurements for the camera 805 and the zone that the camera 805 is located in.

Figure 9:
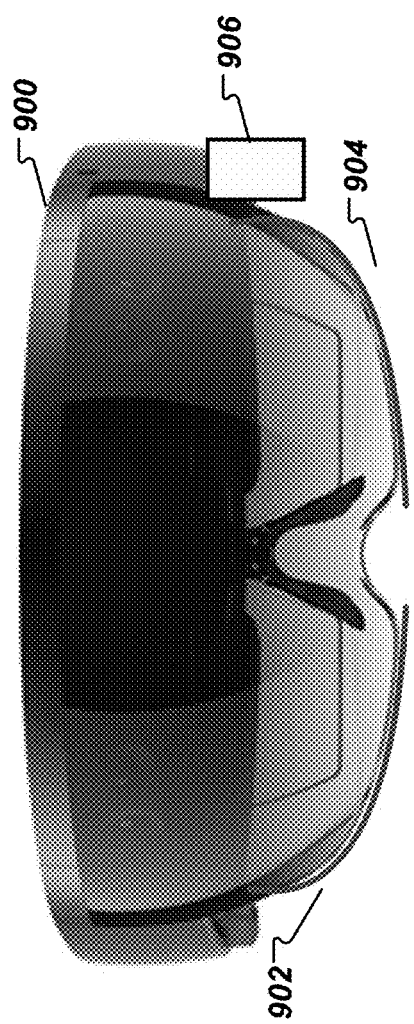
FIG. 9 is a flowchart for predictive heater activation.

FIG. 9 depicts heater elements 902 and 904 affixed to the lenses of an augmented reality headset 900. The heater elements 902, 904 can be attached to suitable portions of the headset 900 to prevent fogging and condensation. In some implementations, the headset 900 includes a rim that circumscribes all or a portion of the lenses of the headset 900. The heater elements 902, 904 may themselves form all or a portion of the rim. Alternatively, the heater elements 902, 904 may be affixed to and extend along a length of all or a portion of the rim. For example, whether employed as part of the rims themselves or affixed to the rims, the heater elements 902, 904 may extend around an entirety of the lenses, or may extend around at least a bottom 75-percent of the circumference of the lenses, between 50-75 percent of the circumference of the lens, between 33-50 percent of the circumference of the lens, between 25-50 percent of the circumference of the lens, between 25-33 percent of the circumference of the lens, or between 10-25 percent of the circumference of the lens. In general, when heater elements wrap around less than the entire circumference of the lens, the heater elements may be arranged along a bottom portion of the lens circumference so that heat emitted from the elements may rise to heat the lens above it. Cost and materials may be saved by not wrapping a top portion of the lens. Similarly, these techniques can be applied to eye glasses and other forms of eye wear (e.g., other virtual or augmented reality headsets) in which the heater elements may wrap around all or a portion of the rim and/or lens of the glasses.

The heater elements 902-904 can comprise linear wire (e.g., aluminum wire), heater coils, or any other conductive components that transfer modulated heat to the lens of the headset 900 without burning the wearer of the headset 900 or making the wearer uncomfortable. In some implementations, a heat paste may be applied around the lens. The heater elements 902-904 are connected to a controller box 906, wherein the controller 906 contains a power supply, such as a battery, and a lens heater controller. The controller 906 further is programmed to monitor operation of the heater elements 902-904. The controller 906 can include a wireless connection to wireless internet (e.g., WIFI) to be able to determine a real-time location of the headset 900 in the facility. In some implementations, the controller 906 may modulate the level of heat applied to the lens based on the height, width, surface area, or other dimension(s) of the lenses. For example, the controller 906 may detect a type or model of the headset 900, and may access data that indicates a size/dimensions of the lenses for the detected type or model of the headset 900. The controller 906 may then increase the amount of heat applied for larger lenses and decrease the amount of heat applied for smaller lenses.

Once the controller 906 determines the location of the headset 900, it can determine what climate zone the headset 900 is located in, what zone the headset 900 is moving towards, and how close the headset 900 is to the next zone. The controller 906 can further receive, by the wireless connection and from the monitoring station previously described, a facility management system, or one or more temperature and humidity measuring devices in each climate zone, one or more real-temperature measurements that correspond to the climate zone that the headset 900 is in and the climate zone that the headset 900 is moving towards. Based on this information, the controller 906 can determine a temperature differential, whether the lens of the headset 900 should be warmed to avoid condensation as the headset 900 moves into the next climate zone, and if so, how much heat and for how long should it be applied to the lens of the headset 900. Then, the controller 906 can apply the determined heat to the lens before the headset 900 moves into the next climate zone. As a result, the headset 900 lens will not fog up as the headset 900 moves seamlessly between different climate zones. The above described steps can be determined by an algorithm that controls the lens heater system.

Figure 10:
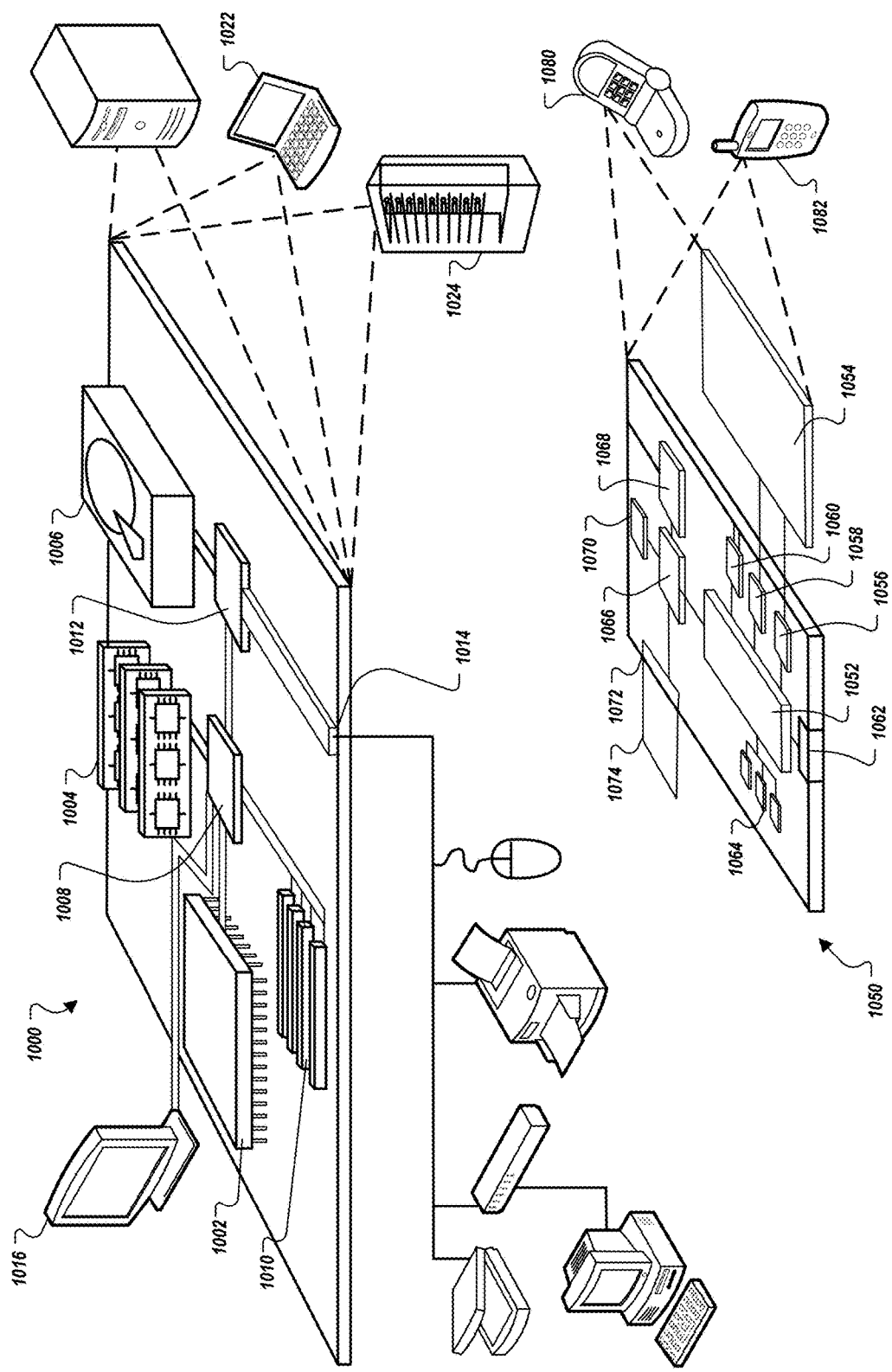
FIG. 10 is a block diagram of computing devices that may be used to implement computer-based systems, methods, devices and other techniques described in this document.

FIG. 10 is a block diagram of computing devices 1000, 1050 that may be used to implement the systems and methods described in this specification, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The invention claimed is:

1. A method for heating a lens to mitigate fogging, the method comprising:
   identifying a temperature of the lens, wherein the lens is mounted to a moveable apparatus configured to move between at least a first environment and a second environment, wherein the first environment is configured to maintain a first temperature and the second environment is configured to maintain a second temperature that is warmer than the first temperature, wherein the lens comprises a transparent material that is mounted to a heater plate that conducts heat to the lens, wherein the temperature of the lens is identified by a temperature sensor;
   determining that the lens mounted to the moveable apparatus is located within the first environment;
   identifying an amount of time that the lens mounted to the moveable apparatus is located within the first environment;
   determining, while the moveable apparatus is located within the first environment, whether a risk of the lens fogging when the movable apparatus moves from the first environment into the second environment exceeds a threshold value based at least in part on the temperature of the lens and the amount of time that the lens mounted to the moveable apparatus is located within the first environment; and
   in response to determining that the risk of the lens fogging exceeds the threshold value, applying heat to the lens to mitigate fogging of the lens via the heater plate before the lens mounted to the moveable apparatus enters the second environment.

2. The method of claim 1, further comprising:
   identifying a second temperature of the lens; and
   deactivating the heating element based on the second temperature of the lens being equal to or less than the second temperature of the second environment.

3. The method of claim 1, wherein, in response to determining that the risk of the lens fogging exceeds the threshold value, applying heat to the lens via the heater plate for a duration of time that the lens mounted to the moveable apparatus is expected to be located within the first environment.

4. The method of claim 3, wherein applying heat to the lens to mitigate fogging of the lens via the heater plate comprises activating the heater plate at a low power setting for the duration of time that the lens mounted to the moveable apparatus is expected to be located within the first environment.

5. The method of claim 1, wherein, in response to determining that the risk of the lens fogging exceeds the threshold value, applying heat to the lens via the heater plate (1) a predetermined amount of time before the lens mounted to the moveable apparatus moves from the first environment to the second environment and (2) for a time interval that is less than a duration of time that the lens mounted to the moveable apparatus is expected to be located within the first environment.

6. The method of claim 5, wherein heat is applied to the lens via the heater plate while the lens mounted to the moveable apparatus moves from the first environment to the second environment.

7. The method of claim 5, wherein applying heat to the lens to mitigate fogging of the lens via the heater plate comprises activating the heater plate at a high power setting during the time interval that is less than the duration of time that the lens mounted to the moveable apparatus is expected to be located within the first environment.

8. The method of claim 1, wherein determining whether a risk of the lens fogging exceeds a threshold value is further based at least in part on (1) an amount of time it takes for the lens mounted to the moveable apparatus to move from the first environment to the second environment and (2) an amount of time that the lens mounted to the moveable apparatus is expected to be located within the second environment.

9. The method of claim 8, wherein the amount of time that the lens mounted to the moveable apparatus is expected to be located within the second environment is based at least in part on (1) a route that the lens mounted to the moveable apparatus is expected to take from the first environment to the second environment and (2) an average amount of time that the lens mounted to the moveable apparatus has spent located within the second environment.

10. The method of claim 1, further comprising applying heat to the lens to mitigate fogging of the lens via the heater plate when the lens mounted to the moveable apparatus is located a predetermined distance away from the second environment.

11. The method of claim 1, wherein applying heat to the lens to mitigate fogging of the lens via the heater plate comprises raising a power setting of the heater plate from a low power setting to a high power setting, wherein the low power setting provides a constant low level of heat to the lens over a long period of time and the high power setting provides a higher level of heat to the lens over a shorter period of time.

12. The method of claim 1, further comprising deactivating the heater plate when the lens mounted to the moveable apparatus enters the second environment.

13. The method of claim 1, wherein applying heat to the lens to mitigate fogging of the lens is based on the temperature of the lens, a difference in temperature between the first environment and the second environment, and the amount of time that the lens mounted to the moveable apparatus is located within the first environment.

14. The method of claim 1, wherein applying heat to the lens to mitigate fogging of the lens via the heater plate comprises activating a heating element and thermally conducting heat from the heating element to the lens, wherein the heater plate abuts the heating element.

15. A system for heating a lens to mitigate fogging, the system comprising:
an enclosed facility comprising at least a first temperature-controlled environment and a second temperature-controlled environment; and
a movable apparatus configured to move between at least the first temperature-controlled environment and the second temperature-controlled environment, the moveable apparatus comprising:
a heater plate;
the lens that (i) is mounted to the moveable apparatus and (ii) comprises a transparent material that is mounted to the heater plate;
a heating element that abuts the heater plate, wherein the heater plate is configured to thermally conduct heat from the heating element to the lens;
a temperature sensor that is mounted to the heater plate on an opposing side from the heating element; and
a controller configured to perform operations comprising:
identifying a temperature of the lens by the temperature sensor;
determining that the lens mounted to the moveable apparatus is located within the first temperature-controlled environment;
identifying an amount of time that the lens mounted to the moveable apparatus is located within the first temperature-controlled environment;
determining whether a risk of the lens fogging exceeds a threshold value based at least in part on the temperature of the lens and the amount of time that the lens mounted to the moveable apparatus is located within the first temperature-controlled environment; and
in response to determining that the risk of the lens fogging exceeds the threshold value, applying heat to the lens to mitigate fogging of the lens before the lens mounted to the moveable apparatus enters the second temperature-controlled environment.

16. The system of claim 15, wherein:
the lens is mounted to the heater plate proximate the temperature sensor and on the opposing side from the heating element;
the temperature sensor provides a temperature signal that corresponds to the temperature of the lens; and
the heating element is activated by a switch that couples and decouples the heating element to a power source based at least in part on the temperature signal from the temperature sensor, a difference in temperature between the first temperature-controlled environment and the second temperature-controlled environment, and the amount of time that the lens mounted to the moveable apparatus is located within the first temperature-controlled environment.

17. The system of claim 15, wherein the first temperature-controlled environment is configured to maintain a first temperature and the second temperature-controlled environment is configured to maintain a second temperature that is warmer than the first temperature.

18. The system of claim 15, wherein applying heat to the lens to mitigate fogging of the lens comprises activating the heating element and thermally conducting heat from the heating element to the lens via the heater plate.

19. The system of claim 15, wherein the moveable apparatus is a mobile device, a wearable device, a forklift, a pallet, or a box.

20. An apparatus for heating a lens to mitigate fogging, the apparatus comprising:
a heater plate;
the lens mounted to a moveable apparatus configured to move between at least a first environment and a second environment, wherein the first environment has a first temperature and the second environment has a second temperature that is warmer than the first temperature, the lens comprising a transparent material that is mounted to the heater plate;
a heating element that abuts the heater plate, wherein the heater plate is configured to thermally conduct heat from the heating element to the lens;
a temperature sensor that is mounted to the heater plate on an opposing side from the heating element; and
a controller configured to:
identify a temperature of the lens by the temperature sensor;
determine that the lens mounted to the moveable apparatus is located within the first environment;
identify an amount of time that the lens mounted to the moveable apparatus is located within the first environment;
determine whether a risk of the lens fogging exceeds a threshold value based at least in part on the temperature of the lens and the amount of time that the lens mounted to the moveable apparatus is located within the first environment; and in response to determining that the risk of the lens fogging exceeds the threshold value, apply heat to the lens to mitigate fogging of the lens by activating the heating element and thermally conducting heat from the heating element to the lens via the heater plate before the lens mounted to the moveable apparatus enters the second environment.

* * * * *